April 17, 1928.  H. A. CLARK  1,666,845

CHAIN REVERSING MECHANISM

Filed June 29, 1925

Harry A. Clark
INVENTOR.

BY  J. C. Waldrop
ATTORNEY.

Patented Apr. 17, 1928.

1,666,845

UNITED STATES PATENT OFFICE.

HARRY A. CLARK, OF WICHITA FALLS, TEXAS.

CHAIN-REVERSING MECHANISM.

Application filed June 29, 1925. Serial No. 40,442.

This invention relates to tractor driven winches on which a rotatable drum is disposed laterally of the winch frame and arranged so as to be actuated by a chain and sprocket mechanism driven from a lateral shaft disposed so as to transmit power from the tractor mechanism to the said drum actuating mechanism, and the invention more particularly relates to a chain reversing device to be employed in reversing the motion of the said drum, without effecting the speed or direction of rotation of the driving elements of said winch.

The invention further contemplates the provision of a device of the character described in the foregoing, which may be readily operated from an accessible location from the operator's seat upon the tractor; its function to be governed conjointly by the same elements provided for operating the clutch mechanism.

With the above and further objects and advantages in view, the invention has particular reference to the novel construction and assembly of parts of the device by which the foregoing objects are attained, and which will be enumerated in the course of the following detail description and illustrated in the appended drawings.

Figure 1:
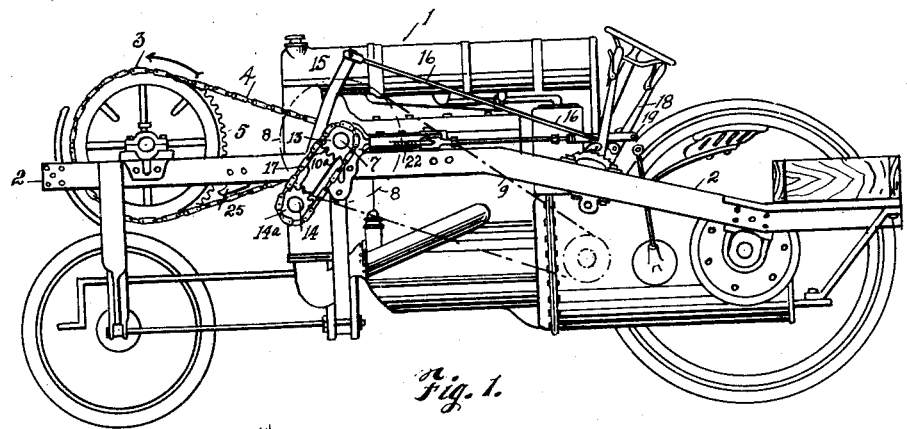
Figure 1 represents an elevational view of a tractor driven winch, upon which the invention is applied.

In proceeding in accordance with the foregoing, 1 denotes preferably a Fordson tractor having a frame 2 disposed thereon, which frame consists of a pair of metal beams extending past either end of the tractor body. A drum 3 is mounted laterally upon these beams in suitable bearings provided therefor, and is adapted to be rotated by a chain 4, surrounding a drum gear 5 and a sprocket 6, freely mounted upon a countershaft 7, which latter element is, also, mounted in bearings disposed upon the beams constituting the said frame 2. Upon the opposite side of the frame 2, a large sprocket 8 is received by the other end of the countershaft 7, which sprocket is provided with a chain drive 9, shown in broken lines in Figure 1, receiving power of rotation from the transmission mechanism of the tractor. Thus it will be seen the manner by which the drum 3 is rotated by transmitted power.

Figure 2:
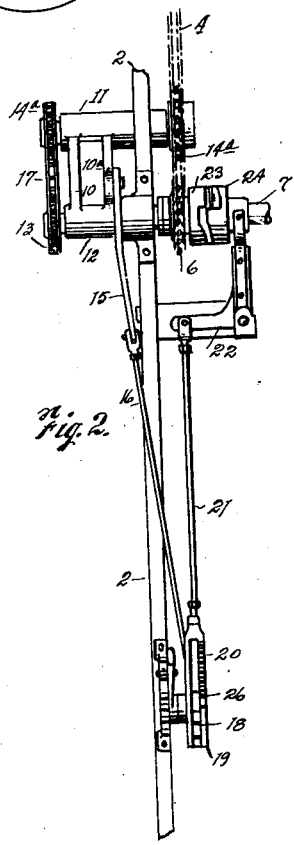
Figure 2 is a plan view of the clutch mechanism, chain reverse mechanism and the associated operating elements.
Figure 3:
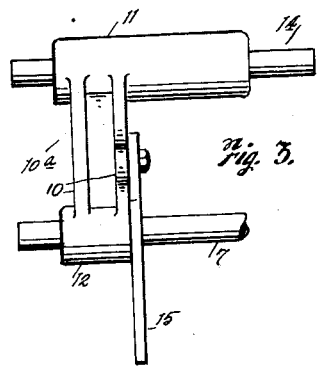
Figure 3 is a preferred form of frame, forming a part of the structure embodied in the invention.

Since the direction of rotation of the drum 3 is at all times forward, it has been found desirable to provide a means whereby the drum may be suddenly reversed if necessary, without altering the direction of rotation of the driving mechanism. This means consists of a frame 10$^a$, shown in detail in Figure 3, which provides a long bearing 11 and a short bearing 12, joined by braces 10. The short bearing 12 is mounted upon the protruding end of the countershaft 7, whereby to permit the long bearing 11 to extend inwardly, beneath the frame 2 (as shown in Figure 2.) The short bearing 12 is mounted upon shaft 7, subsequent to the mounting of the drum rotating gear 6, freely mounted on the same shaft, on the reverse side of the beam, and a sprocket 13 is keyed upon the extreme end of the shaft 7.

In the long bearing 11 a short shaft 14 is disposed, having sprockets 14$^a$ keyed upon its protruding ends. A short chain 17 surrounds the outer of these sprockets and the sprocket 13 upon the end of the countershaft 7, by which means the shaft 11 receives its rotation.

The lever 15, illustrated in Figures 1 and 2, is rigidly bolted to the frame 10$^a$, as shown, and extends upwardly where a rod 16 is pivoted thereto and is directed rearwardly to a point adjacent the operator's seat, where it is pivoted to a clutch actuating lever 18, immediately below a toothed slide 19, in which the lever 18 reciprocates. This slide is provided with a series of teeth 20, as shown in Figure 2, and has attached thereto a rod 21 which extends forwardly of the tractor where it operates a bell crank 22, of the clutch actuating mechanism.

Figure 4:
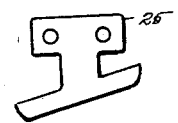
Figure 4 is a slide disposed upon the machine frame to limit the upward movement of the chain.

Assuming therefore, that the countershaft 7, upon rotation, causes the drum 3 to be rotated in the direction of the arrow, as in Figure 1, and it is desired to suddenly reverse the direction of rotation thereof. The clutch lever 18 is pulled forward from the operator's seat, causing the frame 10$^a$, which is freely mounted upon the countershaft 7, to swing upwardly, thereby permitting the inner sprocket 14$^a$ to conformably engage with the returning under links of the chain 4, surrounding the drum gear 5. It has been previously mentioned that the sprocket 6, by which the chain 4 is actuated, and the half of the clutch mechanism 24, is freely mounted upon the counter shaft 7, which permits the drum rotating mechanism to be readily released when desired, also, by the clutch lever 18, half of the clutch mechanism 24 revolves with the shaft 7, as indicated in Figure 2 of the drawings. A slide 25, shown in detail in Figure 4, is mounted upon the beam 2, whereby it engages the rollers of the chain 4, to limit the upward movement thereof when the sprocket 14$^a$ engages it.

It is clearly shown in Figure 2; that a limited movement of the lever 18, sufficient to engage the inner sprocket 14$^a$ with the chain 4, may be made before the clutch is actuated, as the slide 19 permits free movement of the lever 18 until it contacts with the extreme end thereof, at which time the clutch is actuated. Should it be desired to actuate the clutch to the exclusion of the reversing mechanism, the dog 26 is caused to engage with the teeth 20 and a reverse pull is made on the clutch rod 21 without affecting the chain reversing mechanism.

Obviously, therefore, when the sprocket 14$^a$, which is revolving in an opposite direction to that of the returning links of the chain 4, engages therewith, the identical power employed for driving the drum 3 is applied to reverse the latter, without requiring reduction of speed or altering the direction of rotation of the drum mechanism whatsoever.

The invention has been described as including all the elements as set forth in the appended claims, however, it should be understood that minor changes and modifications may be made therein, without departing from the spirit and intent of the said invention.

What is claimed is:—

1. In a reversing mechanism, a shaft, a sprocket thereon, a second sprocket, a sprocket chain engaged over said sprockets, a swinging frame supported from said shaft and having a pair of sprockets thereon, a second sprocket on said shaft, a sprocket chain engaged over one of the frame sprockets and over the second shaft sprocket, a clutch on the shaft for operating the first sprocket of the shaft, a single operating lever, means connected to the lever and to the frame to swing the latter thereby to move the other sprocket of the frame into engagement with the first named sprocket chain, and means connected to the lever and to the clutch to operate the latter in one movement of the lever.

2. In a reversing mechanism, a driven shaft, a rotatable element, means to rotate said element from the shaft, means engageable with the rotating means to reverse the same, means to actuate said reversing means, a clutch on the shaft, a single operating device, means to connect the device to the reversing means to move the latter into and out of engagement with the means for rotating the element and means connected to the device and to the clutch to operate the clutch subsequent to operation of the reversing means, and means to permit of actuation of the clutch from said device to the exclusion of operation of the reversing means.

3. In a reversing mechanism, a driven shaft, an endless chain operated by the shaft, a clutch on the shaft, a swinging frame, a rotatable member on the frame, means to actuate the member from the shaft, means to swing the frame to move its member into and out of engagement with the chain and to operate the clutch, and means engaging the chain on the side face thereof opposite to the side face engaged by the rotatable member to hold the chain engaged with the latter.

In testimony whereof I affix my signature.

HARRY A. CLARK.